US008315655B1

(12) United States Patent
Cole

(10) Patent No.: US 8,315,655 B1
(45) Date of Patent: Nov. 20, 2012

(54) SYSTEM AND METHOD USING MOBILE PHONE AS TEST SYSTEM COMPONENT

(75) Inventor: Joshua R. Cole, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 13/181,455

(22) Filed: Jul. 12, 2011

(51) Int. Cl.
*H04W 4/00* (2009.01)
*H04W 24/00* (2009.01)

(52) U.S. Cl. .................................. 455/466; 455/423

(58) Field of Classification Search .............. 455/69, 455/423, 518, 67.14, 570, 507, 414.1, 422.1, 455/414.3, 63.4; 370/331, 252, 338, 311, 370/310; 705/14.38, 26.3
See application file for complete search history.

(56) References Cited

U.S. PATENT DOCUMENTS

| 7,751,813 | B2* | 7/2010 | Varanda ................ 455/423 |
| 2007/0124583 | A1* | 5/2007 | Andersson et al. ........ 713/165 |
| 2011/0263243 | A1* | 10/2011 | Topaltzas et al. .......... 455/423 |

OTHER PUBLICATIONS

Cole, Joshua R., et al., Patent Application entitled "Handset Diagnostic Tool," filed on Mar. 4, 2011, U.S. Appl. No. 13/041,195.

* cited by examiner

*Primary Examiner* — Kiet Doan

(57) ABSTRACT

A testing system is provided. The system comprises a computer system, a memory coupled to the computer system, an application stored in the memory, and a mobile phone. The mobile phone comprises a radio transceiver, a process, and a data interface, where the mobile phone is coupled to the computer system via the data interface. When executed by the computer system, the application establishes a communication link with a wireless network via the mobile phone. Based on a test script, the application directs the mobile phone to generate a plurality of wireless network events via the communication link. The application then retrieves information from the mobile phone about the wireless network events, analyzes the information about the wireless network events, and presents the analysis results.

15 Claims, 6 Drawing Sheets

SYSTEM AND METHOD USING MOBILE PHONE AS TEST SYSTEM COMPONENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices used for mobile voice or data communication based on network connectivity provided by base stations known as cell towers or sites. In addition to the standard voice function of a mobile telephone, current mobile phones and other similar portable electronic devices may support additional services including short message service (SMS) for text messaging, electronic mail, and packet switching for access to the Internet.

SUMMARY

In an embodiment, a testing system using a mobile phone as a test system component is disclosed. The system comprises a computer system, a memory coupled to the computer system, an application stored in the memory, and a mobile phone. The mobile phone comprises a radio transceiver, a process, and a data interface, where the mobile phone is coupled to the computer system via the data interface. When executed by the computer system, the application establishes a communication link with a wireless network via the mobile phone. Based on a test script, the application directs the mobile phone to generate a plurality of wireless network events via the communication link. The application then retrieves information from the mobile phone about the wireless network events, analyzes the information about the wireless network events, and presents the results of the analysis.

In an embodiment, a method of testing a wireless network is disclosed. The method comprises coupling a mobile phone to a first computer. A wireless link is established between the mobile phone and a base transceiver station, where the base transceiver station is coupled to a wireless network. A plurality of test commands is sent from the first computer to the mobile phone. In response to the test commands, wireless network events are generated by the mobile phone. A first plurality of information about the network events is stored on the mobile phone. A second plurality of information about the network events is stored by a second computer coupled to the wireless network. The first plurality of information is retrieved by the first computer from the mobile phone. A status of the wireless network is determined based on one of the first computer and the second computer analyzing the first and second plurality of information.

In an embodiment, a method of testing a wireless network is disclosed. The method comprises a plurality of mobile phones, where each of the mobile phones is the same first model of mobile phone. Each of the mobile phones is coupled to a computer. A wireless link is established between each of the mobile phones and a base transceiver station, where the base transceiver station is coupled to a wireless network. A plurality of test commands is sent from the first computer to each of the mobile phones. In response to the test commands, wireless network events are generated by each of the mobile phones. A plurality of information about the network events is stored on each of the mobile phones. The plurality of information is retrieved from the mobile phones by the computer. Based on the computer analyzing the plurality of information, a wireless communication problem experienced by the first model of mobile phone in the wireless network is identified.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
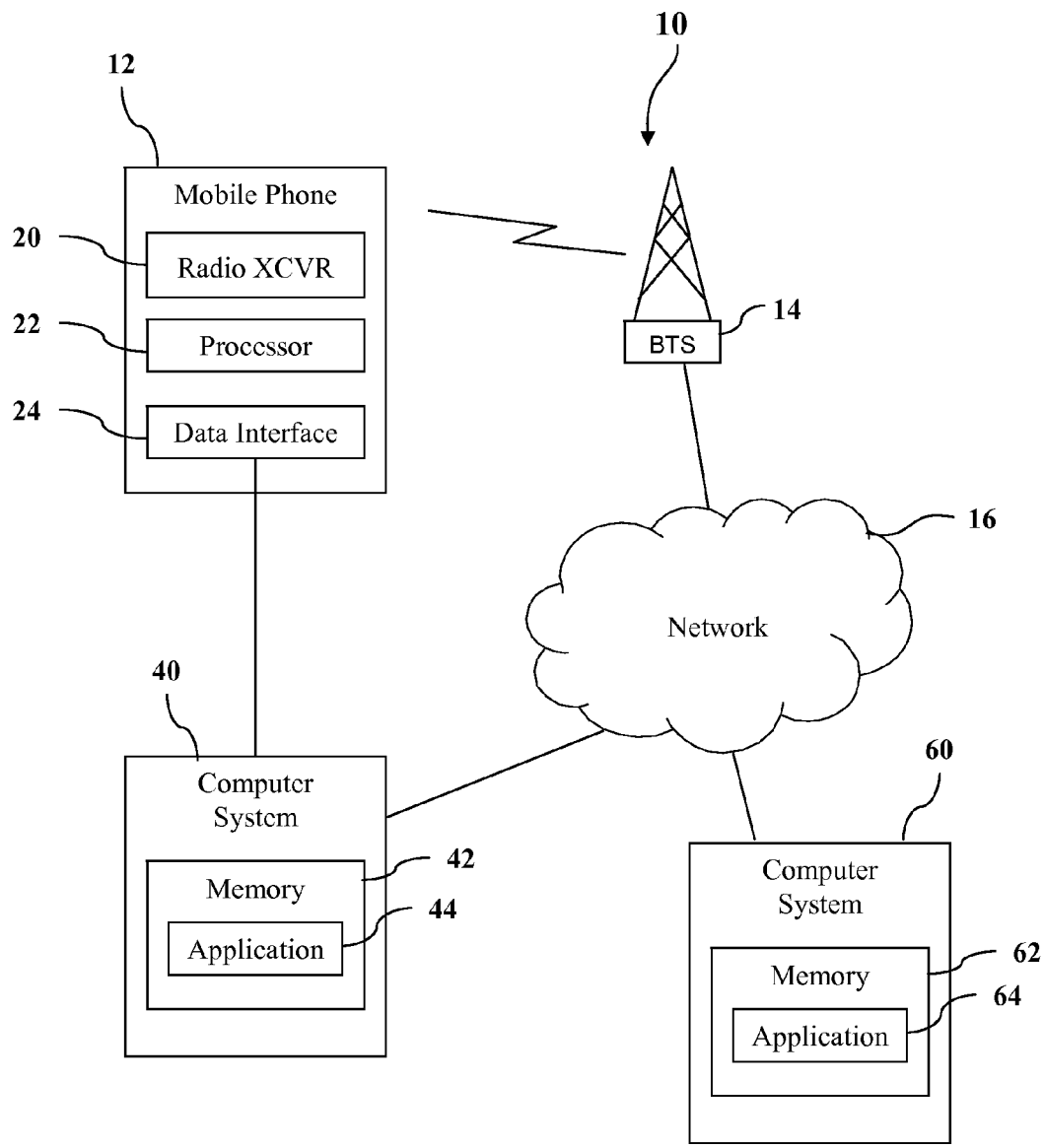
FIG. 1 is a block diagram of a testing system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system and method of testing a wireless network is described. A mobile phone is coupled to a computer system, where the computer system is executing a diagnostic or testing application. A wireless communication link is established between the mobile phone and a base transceiver station, where the base transceiver station is coupled to a wireless network. The computer system sends a plurality of test commands to the mobile phone, and the mobile phone generates wireless network events in response to the test commands. In this manner, the diagnostic application on the computer system is controlling the mobile phone through the test commands. The mobile phone becomes a test device for generating network events, and because the control is in the diagnostic application on the computer system, any mobile phone may be used. The mobile phone stores the results of the test commands, and the diagnostic application on the computer system retrieves the information upon completion of the testing. For further details about the test system, see U.S. patent application Ser. No. 13/041,195 filed Mar. 4, 2011, and entitled "Handset Diagnostic Tool," by Joshua R. Cole, et al., which is hereby incorporated by reference in its entirety.

In addition to the mobile phone generating network events, the test system may include a second computer which is coupled to the wireless network. The second computer may collect information about the network events from the wireless network, which can be compared and analyzed in conjunction with the information collected by the mobile phone. Comparing and contrasting the network event information received from the mobile phone with the network event information from the wireless network may provide a broader view of what is occurring on the wireless network to more quickly identify problems. The second computer may also act as a server, collecting network event information from a plurality of mobile phones coupled to a plurality of client computers which may be referred to as a client/server model. This enables the second computer to generate large amounts of network events and evaluate statistics based on information from network events across the wireless network.

Additionally, the distributed client/server model allows the ability to test geographically and with a specific device. If users are reporting problems with dropped calls in a certain location with a specific model of mobile phone, a technician can be sent to the location with a computer and a mobile phone matching the specific model and can execute a test script to generate network events and collect the information about the events to be analyzed. If a plurality of problems are reported in a specific area, multiple mobile phones and computers can be set up in the area to attempt to duplicate and analyze the problems in the location they are occurring. The test system will allow responding to reported problems by testing with equipment similar to the equipment that was reported as experiencing the problem. The test system is scalable and portable.

Extending this idea further, home users could be enlisted as clients. When a home user plugs their mobile phone into their computer to recharge the mobile phone, diagnostic software downloaded to the computer may be executed and send test commands to use the mobile phone as a probe to generate network events while charging. This may provide the second computer, which is coupled to the wireless network, or a second master handset controlling computer overseeing the distributed handset controlling computers, with many client computers coupled to many mobile phones to deliver network event information that can be compiled together and evaluated. Because these network events would be generated by actual customer mobile phones geographically located throughout the network a true real world view of network issues may be obtained.

Turning now to FIG. 1, a test system 10 is described. The test system 10 comprises a mobile phone 12, a base transceiver station (BTS) 14, a network 16, a first computer system 40, and a second computer system 60. The base transceiver station 14 provides a communication link to the mobile phone 12 and couples the mobile phone 12 to the network 16. While a single base transceiver station 14 is illustrated in FIG. 1, it is understood that the test system 10 may comprise any number of base transceiver stations 14 and any number of mobile phones 12. It is understood that, in an embodiment, devices other than the mobile phone 12 may fulfill the role of the mobile phone 12 in the test system 10. For example, one or more of a personal digital assistant (PDA), media player, laptop computer, and other devices having wireless connectivity to the base transceiver station 14 may be used instead of or in addition to the mobile phone 12.

The network 16 may be a public communication network, a private communication network, or a combination thereof. The mobile phone 12 comprises a radio transceiver 20, a processor 22, and a data interface 24. The computer system 40 comprises a memory 42, and an application 44 stored in the memory 42. In an embodiment, the mobile phone 12 is coupled to the computer system 40 via the data interface 24. The application 44, when executed by the computer system 40, establishes a communication link with a wireless network via the mobile phone 12. Based on a test script, the application 44 directs the mobile phone 12 to generate a plurality of network events such as connecting a voice call or establishing a data connection via the communication link. By utilizing an actual mobile phone 12 as opposed to specialized network test equipment such as a network probe to generate the network events, the test system is reproducing customer use, not approximating it. The application 44 then retrieves information about the network events from the mobile phone 12, analyzes the information about the network events, and presents the results of the analysis. The analysis may include calls completed, calls failed, and other statistics which describe the network events generated.

In an embodiment, the test script may be developed for testing mobile phones themselves, in a production facility and/or in a distribution center. In an embodiment, the use of the test script in test system 10 may be viewed as repurposing the test script and/or drawing supplementary value from the test script. Alternatively, in an embodiment, the use of the test script in test system 10 may be viewed as providing more consistent and comparable testing results.

In an embodiment, the communication link with the wireless network is based on one of a code division multiple access (CDMA) wireless communication protocol, a global system for mobile communications (GSM) wireless communication protocol, a long term evolution (LTE) wireless communication protocol, a worldwide interoperability for microwave access (WiMAX) wireless communication protocol, or other cellular protocol. These wireless communication protocols may be used in a traditional cellular telephone network for handling traffic and signaling between the mobile phones 12 and the wireless network switching subsystem. In an embodiment, the network events are at least one of connecting a voice call, establishing a data connection, sending a short message service (SMS) message, and sending a multimedia message service (MMS) message. These mobile phone functions result in the mobile phone communicating with the wireless network which generates the associated network events.

In an embodiment, the information about the network events is retrieved by the application 44 from a wireless communication history stored in a memory of the mobile phone 12. The mobile phone 12 logs all calls, messages, and all network events it receives while communicating with the wireless network to the memory of the mobile phone 12. The application 44 has access to the memory of the mobile phone 12 through the coupling with the computer system 40 and can retrieve the history to analyze the information.

The present disclosure also teaches a computer system 60 which may comprise a memory 62, and an application 64 stored in the memory 62. In an embodiment, the application 44 further receives a second test script from a computer system 60 and based on the second test script, directs the mobile phone 12 to generate a second plurality of wireless network events via the communication link. After analyzing the information from the mobile phone 12, the remote computer 60 may identify additional tests to run and transmits the second test script to the computer system 40. The application 44 then directs the mobile phone 12 to generate additional wireless network events based on the second test script. This distributed model allows a computer system 60 to remotely control the mobile phone 12 through the network connected computer system 40. The computer system 60 may control a plurality of mobile phones 12 in this same manner, with the computer system 60 having the ability to analyze the information from the plurality of mobile phones 12 to differentiate between device problems, software problems, location problems, and wireless network problems. Additionally, if changes to the testing are needed or test scripts need to be reconfigured, the changes can be made in one location on the computer system 60 and propagated out to each computer system 40 and on to the coupled mobile phone 12.

In an embodiment, the mobile phone 12 is coupled to the computer system 40 using a universal serial bus (USB) connection. Universal serial bus is a specification to establish communication between devices and a host controller. The host controller in this case is the computer system 40, and mobile phones commonly use universal serial bus as a standard connection method and as a power cord. In an embodiment, the application 44 analyzes the information about the network events to determine at least one of a dropped call frequency metric, a call connection time metric, or other metric. The application 44 retrieves the network event information from the mobile phone 12 and analyzes the information. The application 44 may use the information to calculate how often a call is dropped by the network. The application 44 may also look at call connection time and determine an average connection time for the network events in the test.

In an embodiment, the test system 10 further comprises a second mobile phone 12. The second mobile phone 12 may be identical to the first mobile phone 12, or may be a different model from a different manufacturer. The second mobile phone 12 comprises a radio transceiver 20, a processor 22, and a data interface 24. The second mobile phone 12 is coupled to the computer system 40 via the data interface 24. The computer system 40 is capable of asynchronously communicating with a plurality of mobile phones 12. The application 44 further establishes a second communication link with the wireless network via the second mobile phone 12. Based on the test script, the application 44 directs the second mobile phone 12 to generate a second plurality of wireless network events via the second communication link. The application 44 sends test commands directing the second mobile phone 12 to perform standard device functions such as placing a call, sending a text, accessing the internet, or other device functions. The second mobile phone 12 performing these functions generates events on the wireless network which can be recorded by the mobile phone 12 and retrieved and analyzed by the application 44.

Figure 2:
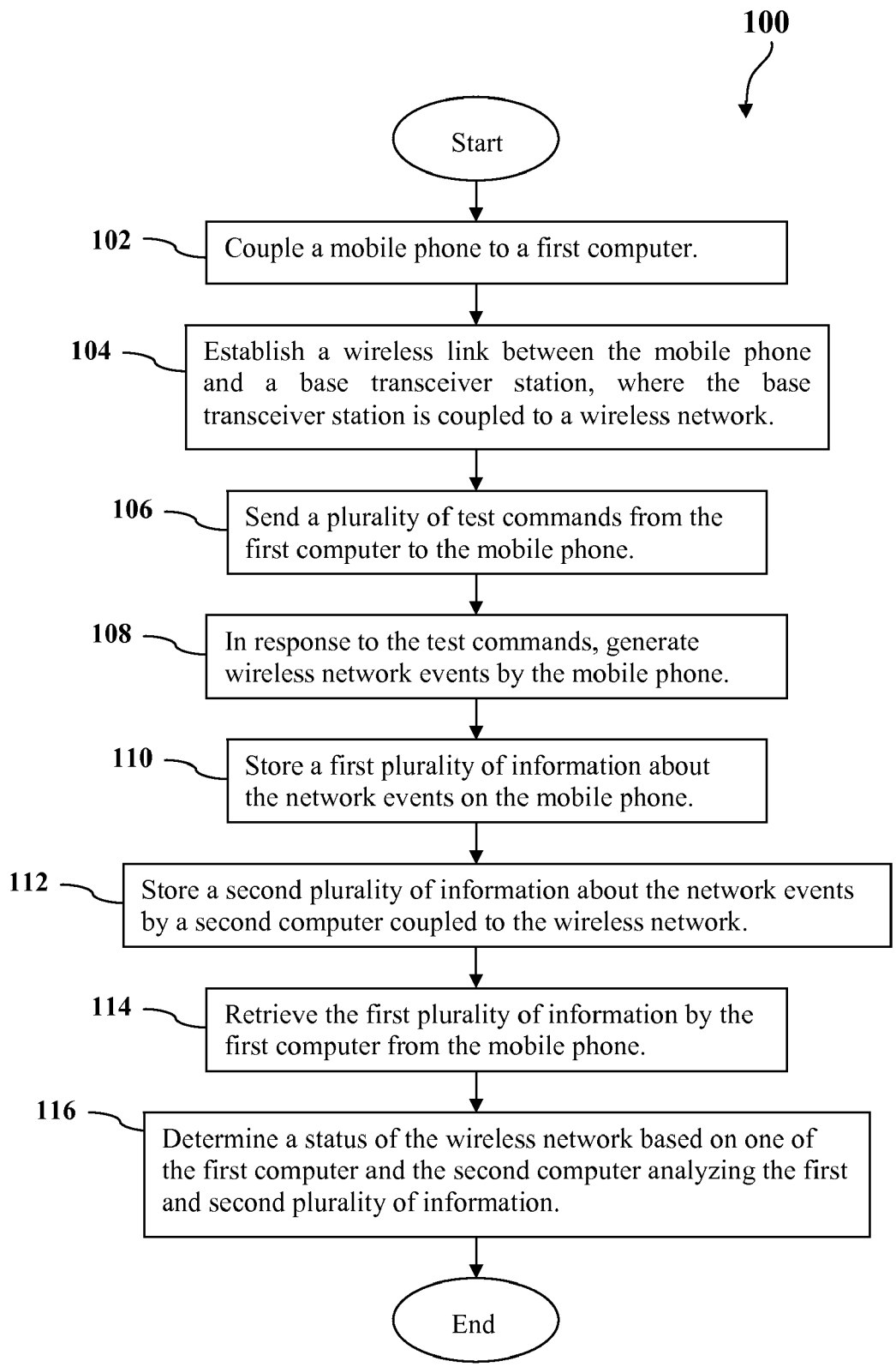
FIG. 2 is a flow chart of a method according to an embodiment of the disclosure.

Turning now to FIG. 2, a method 100 of testing a communication network is described. At block 102, a mobile phone 12 is coupled to a first computer 40. Coupling the mobile phone 12 to the first computer 40 allows the computer 40 to communicate with and control the mobile phone 12. At block 104, a wireless link is established between the mobile phone 12 and a base transceiver station 14, where the base transceiver station 14 is coupled to a wireless network. The base transceiver station 14 facilitates communication between the mobile phone 12 and the wireless network. At block 106, a plurality of test commands are sent from the first computer 40 to the mobile phone 12. The test commands direct the mobile phone 12 to perform standard functions of the mobile phone 12 such as placing calls, sending texts, accessing the internet, or other device functions. At block 108, in response to the test commands, network events are generated by the mobile phone 12. Network events may comprise call origination attempts, text message transmission attempts, email message transmission attempts, data session initiation attempts, and the like. In an embodiment, network events may further comprise interrupting background handshaking with a base station, resuming interrupted background handshaking. In an embodiment, network events may further comprise adjusting a transmission power level of the mobile phone 12. In an embodiment, network events may further comprise adjusting values of channel quality indicators (CQI) or other metrics that may be transmitted by the mobile phone 12 to the base transceiver station 14.

Performing the test commands leads to the mobile phone 12 interacting with the wireless network resulting in network events being generated. At block 110, a first plurality of information about the network events are stored on the mobile phone 12. The mobile phone 12 will keep track of network events such as failed calls and network errors and will store the information on the mobile phone 12. At block 112, a second plurality of information received from the wireless network about the network events is stored by a second computer 60 coupled to the communication network. A second computer 60 is coupled to the communication network and is receiving the network events from network elements in the communication network. At block 114, the first plurality of information is retrieved from the mobile phone by the first computer. At block 116, a status of the communication network is determined based on one of the first computer 40 and the second computer 60 analyzing the first and second plurality of information. The information about the network events is shared between the first computer 40 and the second computer 60. This enables the computer 40 or 60 to compare the network events generated and stored on the mobile phone 12 to the network events recorded by the communication network and analyze the information to receive a complete view of the events and network response.

In an embodiment, the second plurality of information events are generated by network elements excluding the mobile phone 12. The network elements in the communication network react in response to the network events generated by the mobile phone 12 and record the events as seen at the network element. In an embodiment, the network elements generating the second plurality of information events comprise at least one of a base transceiver station (BTS) 14, a mobile switching center (MSC), a media gateway, and a billing server. The base transceiver station 14, mobile switching center, media gateway, and billing server are all communication network elements that may be involved in processing calls and data requests from the mobile phone 12. Each of these network elements may keep records of the network events they receive and these records may be collected by the second computer 60 for analysis of the communication network performance.

In an embodiment, the second plurality of information comprises billing records. A billing server is a network element responsible for recording usage events on the wireless network for the purpose of charging. Information on chargeable events may include time of call set-up, duration of the call, and amount of data transferred. The second computer 60 may retrieve billing records from the billing server as part of testing the communication network. The billing records may then be compared to the information retrieved from the mobile phone 12 to verify that the billing server is creating billing records for each call attempt made by the mobile phone 12, and also that no billing records are created in the event of failures on the wireless network.

In an embodiment, the method 100 further comprises transmitting the first plurality of information from the first computer 40 to the second computer 60, where the second computer 60 analyzes the first and second plurality of information. For example, the first computer 40 may act as a client in the test system, controlling the mobile phone 12 to generate network events and collecting the information from the mobile phone 12 and sending it to the second computer 60. The second computer 60 may act as a server in the test system, providing the test scripts to be executed to the client first computer 40 and analyzing the data received from the client first computer 40 against the data retrieved from the network elements of the wireless network. In an embodiment, the method 100 additionally comprises a third plurality of information about the network events being stored on a second mobile phone 12. The third plurality of information is retrieved from the second mobile phone 12 by a third computer 40. The third plurality of information is transmitted from the third computer 40 to the second computer 60 and is analyzed by the second computer 60. In the client/server example presented above, the third computer 40 is acting as another client performing the same functionality as the first computer 40, but allowing the test system to generate more network events by controlling the second mobile phone 12. The status of the communication network is determined based on the analysis of the first, second, and third pluralities of information. By utilizing a client/server model, the test system may be scalable and enables the ability to easily add additional mobile phones 12 to the test system. The client/server model also allows the ability to test geographically, as any mobile phone 12 in any location may become a test device by coupling the mobile phone 12 with a client computer 40 which has network access to communicate with the server computer 60.

Figure 3:
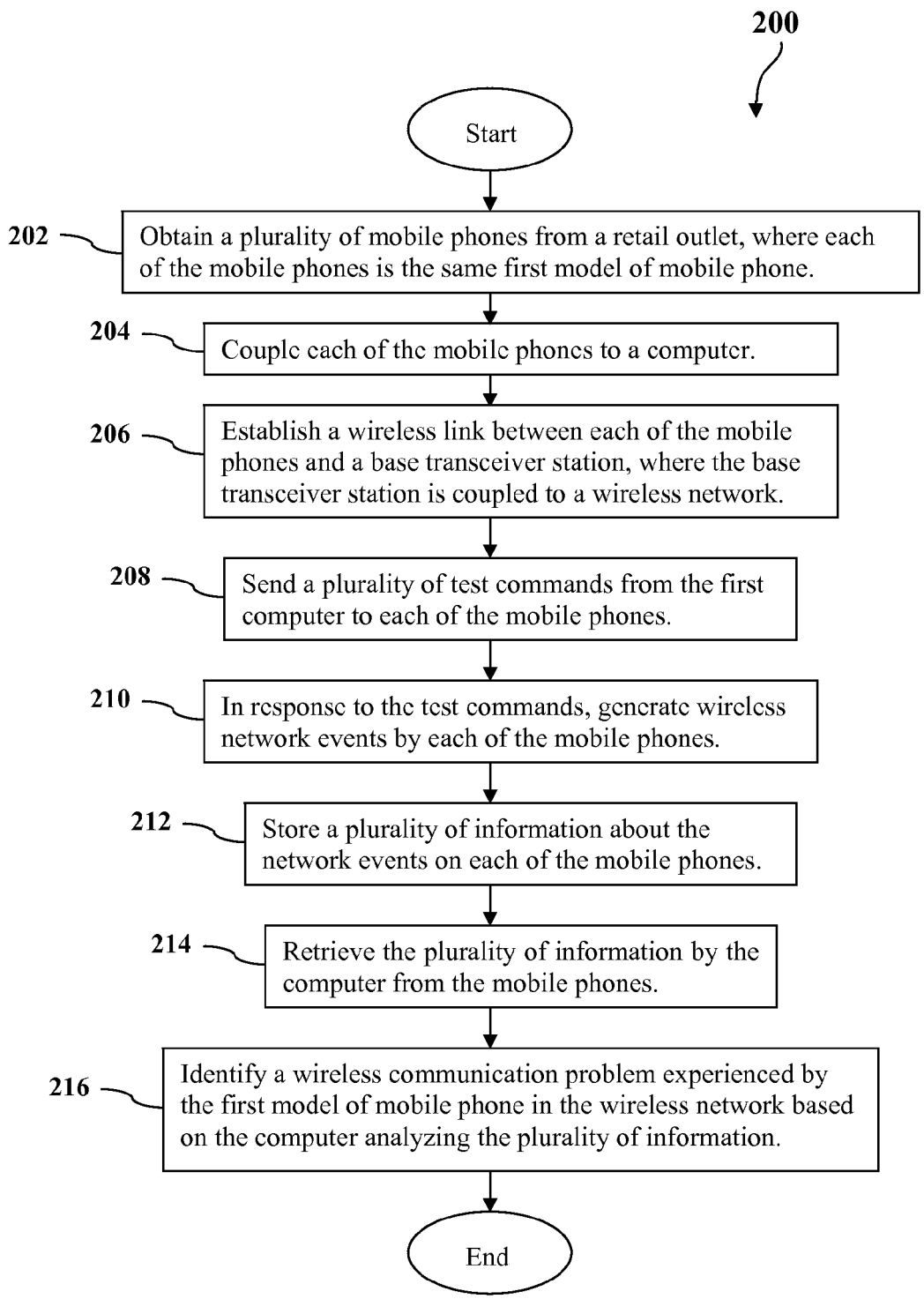
FIG. 3 is a flow chart of a method according to an embodiment of the disclosure.

Turning now to FIG. 3, a method 200 of testing a communication network is described. At block 202, a plurality of mobile phones 12 is obtained from any of a variety of sources. For example, a plurality of mobile phones 12 may be purchased from a retail outlet, where each of the mobile phones 12 is the same first model of mobile phone 12. Alternatively, the plurality of mobile phones 12 may be obtained from a warehouse, where each of the mobile phones 12 is the same first model of mobile phone 12. Alternatively, the plurality of mobile phones 12 may be obtained by direct shipment from an original equipment manufacturer (OEM) of mobile phones, where each of the mobile phones 12 is the same first model of mobile phone 12. Testing with a plurality of mobile phones 12 of the same first model may help identify network issues specific to that model. At block 204, each of the mobile phones 12 is coupled to a computer 40. The plurality of mobile phones 12 may all be coupled to the same computer 40. At block 206, a wireless link is established between each of the mobile phones 12 and a base transceiver station 14, where the base transceiver station 14 is coupled to a wireless network. Each of the mobile phones 12 establishes a communication link to the wireless network in preparation of generating network events on the network.

At block 208, a plurality of test commands is sent from the computer 40 to each of the mobile phones 12. The computer 40 may asynchronously interact with the mobile phones 12, allowing the computer 40 to communicate independently with each mobile phone 12. At block 210, in response to the test commands, network events are generated by each of the mobile phones 12. The test commands direct the mobile phones 12 to interact with the communication network, generating network events from each mobile phone 12. At block 212, a plurality of information about the network events is stored on each of the mobile phones 12. Each mobile phone 12 records the network events received during the execution of the test commands and stores the information. At block 214, the plurality of information from the mobile phones 12 is retrieved by the first computer 40. The computer 40 retrieves the information from each mobile phone 12 so that the results may be combined into a larger data set. At block 216, a wireless communication problem in the network experienced by the first model of mobile phone 12 is identified based on the computer analyzing the plurality of information. By combining the data from the mobile phones 12, the computer 40 is able to identify a problem specific to the first model of mobile phone 12 that may not be seen when testing with other models of mobile phones 12.

In an embodiment, a first plurality of test commands is sent by the first computer 40 to a first of the mobile phones 12 based on a first test script and a second plurality of test commands is sent by the first computer 40 to a second of the mobile phones 12 based on a second test script, where the first test script is different from the second test script. The first computer 40 may control multiple phones 12 but also may instruct them to run different test commands. This allows the test system to more quickly generate a range of network events by distributing the work over multiple phones 12, with each phone 12 generating different network events.

In an embodiment, the method 200 further comprises a second plurality of mobile phones 12, where each of the mobile phones 12 is the same second model of mobile phone 12 and where the second model of phone 12 is different from the first model of phone 12. Testing with the second model of mobile phone 12 may help identify whether a problem is related to the phone 12 model or may be a network problem. Each of the second plurality of mobile phones 12 is coupled to the computer 40. A wireless link is established between each of the second plurality of mobile phones 12 and the base transceiver station 14. Each of the mobile phones 12 establishes a communication link to the wireless network in preparation of generating network events on the network. A plurality of test commands is sent from the computer 40 to each of the second plurality of mobile phones. The test commands direct the mobile phones 12 to interact with the wireless network, generating network events from each mobile phone 12. In response to the test commands, network events are generated by each of the second plurality of mobile phones 12. A second plurality of information about the network events is stored on each of the second plurality of mobile phones 12. The second plurality of information is retrieved by the computer 40 from the second plurality of mobile phones 40. The wireless communication problem in the network experienced by the model of mobile phone 12 is identified based on the computer 40 further analyzing the second plurality of information. By combining the data from the mobile phones 12, the computer 40 is able to identify a problem specific to the second model of mobile phone 12 that did not appear when testing the first model of mobile phone 12.

In an embodiment, the wireless link is based on one of a code division multiple access (CDMA) wireless communication protocol, a global system for mobile communication (GSM) wireless communication protocol, a long term evolution (LTE) wireless communication protocol, a worldwide interoperability for microwave access (WiMAX) wireless communication protocol, or other cellular protocol. These wireless communication protocols are used in a traditional cellular telephone network for handling traffic and signaling between the mobile phones 12 and the wireless network switching subsystem. In an embodiment, the network events are at least one of connecting a voice call, establishing a data connection, sending a short message service (SMS) message, and sending a multimedia message service (MMS) message. These mobile phone 12 functions result in the mobile phone 12 communicating with the network which generates the associated network events. Communication from the wireless network back to the mobile phone 12 allows the mobile phone 12 to store the network events and to be aware of the success or failure of the action.

In an embodiment, sending the plurality of test commands from the first computer 40 to each of the mobile phones 12 comprises sending commands that simulate an activation of user interface input. Execution of the test commands on the mobile phones 12 causes the mobile phone 12 functions to be performed as if a user was selecting an input on the user interface on the device. This allows the test system to reproduce customer use with any mobile phone 12 when testing the network, as the commands are executed in the same manner as when the customer selects an input on the user interface. The test commands may be selected based on the mobile phone 12 model and different commands may be executed for each model. The test system is configured to be able to control different mobile phone 12 models and to execute tests appropriate for each model, interfacing with low-level system calls which duplicate performing the functions on the devices themselves.

Figure 4:
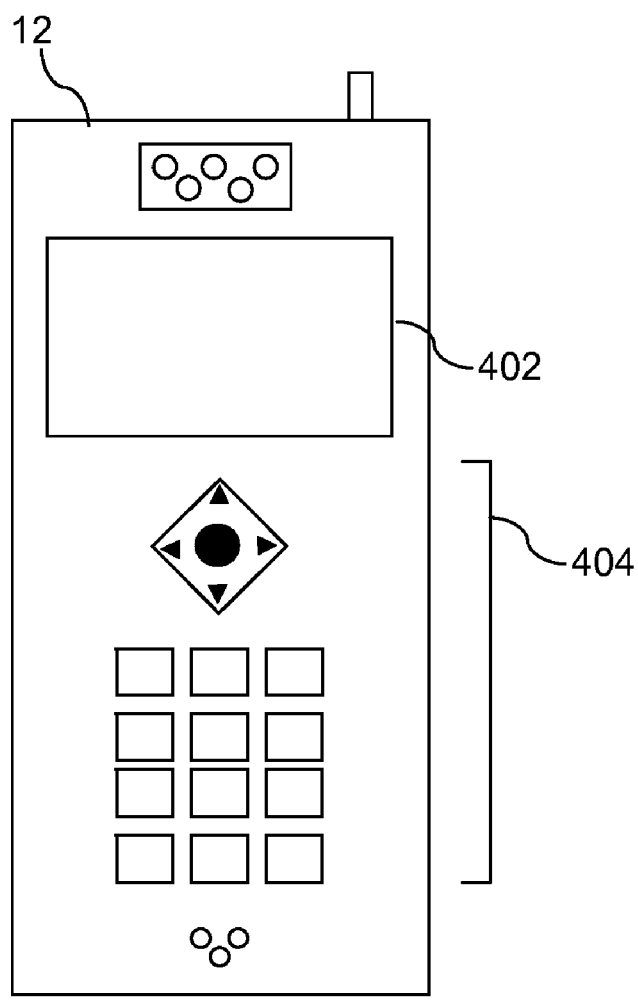
FIG. 4 is an illustration of a mobile device according to an embodiment of the disclosure.

FIG. 4 shows a wireless communications system including the mobile phone 12. FIG. 4 depicts the mobile phone 12, which is operable for implementing aspects of the present disclosure, but the present disclosure should not be limited to these implementations. Though described above with reference to the mobile phone 12, the concepts of the present disclosure may be embodied in various forms, and in an embodiment, the mobile phone 12 may be replaced in system 10 by a pager, a personal digital assistant (PDA), a gaming device, or a media player. The mobile phone 12 includes a display 402 and a touch-sensitive surface and/or keys 404 for input by a user. The mobile phone 12 may present options for the user to select, controls for the user to actuate, and/or cursors or other indicators for the user to direct. The mobile phone 12 may further accept data entry from the user, including numbers to dial or various parameter values for configuring the operation of the handset. The mobile phone 12 may further execute one or more software or firmware applications in response to user commands. These applications may configure the mobile phone 12 to perform various customized functions in response to user interaction. Additionally, the mobile phone 12 may be programmed and/or configured over-the-air, for example from the base transceiver station 14, a wireless access point, or a peer mobile phone 12.

Figure 5:
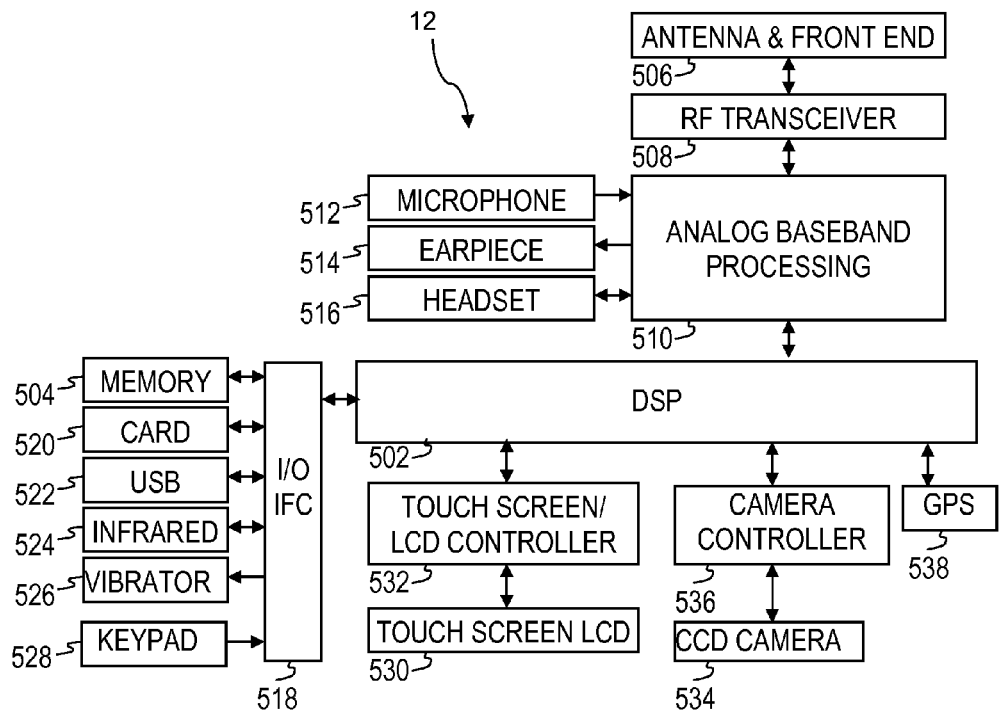
FIG. 5 is a block diagram of a mobile device according to an embodiment of the disclosure.

FIG. 5 shows a block diagram of the mobile phone 12. While a variety of known components of handsets 12 are depicted, in an embodiment a subset of the listed components and/or additional components not listed may be included in the mobile phone 12. The mobile phone 12 includes a digital signal processor (DSP) 502 and a memory 504. As shown, the mobile phone 12 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile phone 12 may include another kind of display that does not provide a touch sensitive screen.

In an embodiment, the DSP 502 may communicate directly with the memory 504 without passing through the input/output interface 518. Additionally, in an embodiment, the mobile phone 12 may comprise other peripheral devices that provide other functionality.

The DSP 502 or some other form of controller or central processing unit operates to control the various components of the mobile phone 12 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile phone 12 to function as a peripheral device to exchange information with a personal computer or other computer system. The infrared port 524 and other optional ports such as a BLUETOOTH interface or an IEEE 802.11 compliant wireless interface may enable the mobile phone 12 to communicate wirelessly with other nearby handsets and/or wireless base stations.

The keypad 528 couples to the DSP 502 via the interface 518 to provide one mechanism for the user to make selections, enter information, and otherwise provide input to the mobile phone 12. Another input mechanism may be the touch screen LCD 530, which may also display text and/or graphics to the user. The touch screen LCD controller 532 couples the DSP 502 to the touch screen LCD 530. The GPS sensor 538 is coupled to the DSP 502 to decode global positioning system signals, thereby enabling the mobile phone 12 to determine its position.

Figure 6A:
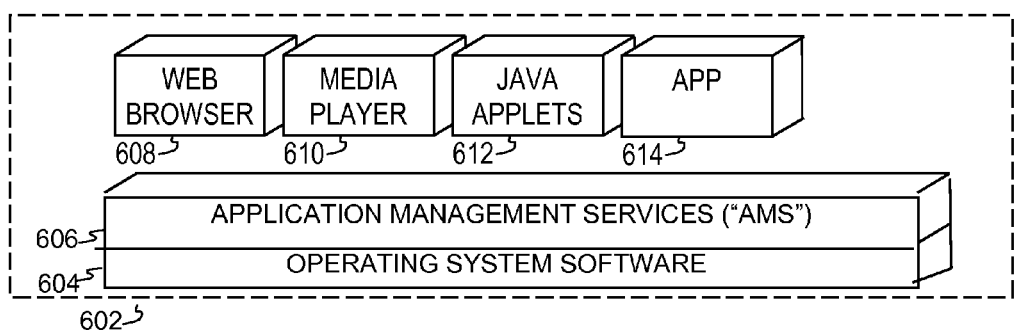
FIG. 6A is a block diagram of a software architecture for a mobile device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile phone 12. Also shown in FIG. 6A are a web browser application 608, a media player application 610, JAVA applets 612, and an application 614. The web browser application 608 configures the mobile phone 12 to operate as a web browser, allowing a user to enter information into forms and select links to retrieve and view web pages. The media player application 610 configures the mobile phone 12 to retrieve and play audio or audiovisual media. The JAVA applets 612 configure the mobile phone 12 to provide games, utilities, and other functionality. The application 614 may be an application configuring the device for a specific purpose such as a calendar or a calculator application.

Figure 6B:
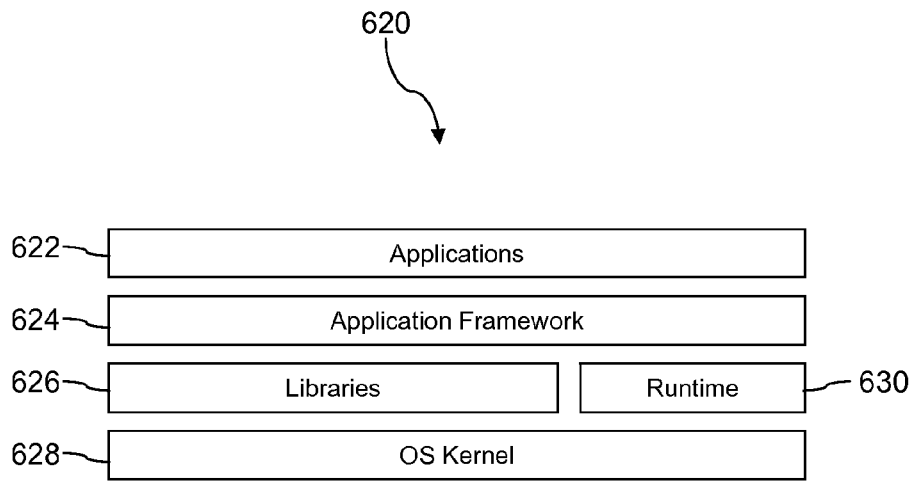
FIG. 6B is a block diagram of another software architecture for a mobile device according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
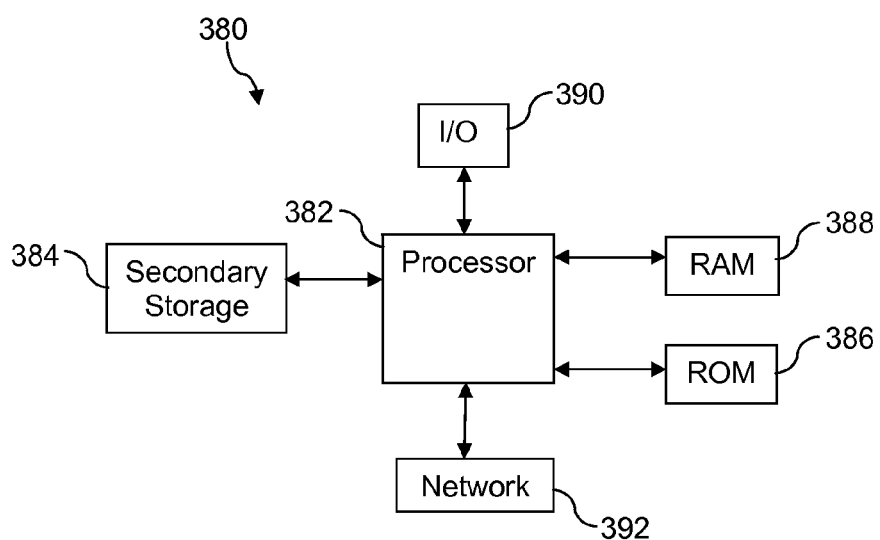
FIG. 7 illustrates an exemplary computer system suitable for implementing the several embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A testing system using a mobile phone as a test system component, comprising:
   a computer system;
   a memory coupled to the computer system;
   a mobile phone, wherein the mobile phone comprises a radio transceiver, a processor, and a data interface, wherein the mobile phone is coupled to the computer system via the data interface;
   a second mobile phone, wherein the second mobile phone comprises a radio transceiver, a processor, and a second data interface, wherein the second mobile phone is coupled to the computer system via the second data interface; and
   an application stored in the memory that, when executed by the computer system,
      establishes a communication link with a wireless network via the mobile phone,
      based on a test script, directs the mobile phone to generate a plurality of wireless network events via the communication link,
      retrieves information from the mobile phone about the wireless network events,
      analyzes the information about the plurality of wireless network events, wherein the application analyzes the information about the plurality of wireless network events to determine at least one of a dropped call frequency metric and a call connection time metric, and
      presents the analysis results, wherein the application further establishes a second communication link with the wireless network via the second mobile phone and, based on the test script, directs the second mobile phone to generate a second plurality of wireless network events via the second communication link.

2. The system of claim 1, wherein the communication link is based on one of a code division multiple access (CDMA) wireless communication protocol, a global system for mobile communications (GSM) wireless communication protocol, a long term evolution (LTE) wireless communication protocol, and a worldwide interoperability for microwave access (WiMAX) wireless communication protocol.

3. The system of claim 1, wherein the plurality of wireless network events are at least one of connecting a voice call, establishing a data connection, sending a simple message service (SMS) message, and sending a multimedia message service (MMS) message.

4. The system of claim 1, wherein the information is retrieved by the application from a wireless communication history stored in a memory of the mobile phone.

5. The system of claim 1, wherein the application further receives a second test script from a remote computer and based on the second test script, directs the mobile phone to generate a third plurality of wireless network events via the communication link.

6. The system of claim 1, wherein the mobile phone is coupled to the computer system using a universal serial bus (USB) connection.

7. A method of testing a wireless network, comprising:
coupling a mobile phone to a first computer;
establishing a wireless link between the mobile phone and a base transceiver station, wherein the base transceiver station is coupled to a wireless network;
sending a plurality of test commands from the first computer to the mobile phone;
in response to the test commands, generating wireless network events by the mobile phone;
storing a first plurality of information about the network events on the mobile phone;
storing a second plurality of information received from the wireless network about the network events by a second computer coupled to the wireless network;
retrieving the first plurality of information by the first computer from the mobile phone;
transmitting the first plurality of information from the first computer to the second computer, wherein the second computer analyzes the first and second plurality of information;
determining a status of the wireless network based on the second computer analyzing the first and second plurality of information;
storing a third plurality of information about the network events on a second mobile phone;
retrieving the third plurality of information by a third computer from the second mobile phone;
transmitting the third plurality of information from the third computer to the second computer;
analyzing the third plurality of information by the second computer; and
determining the status of the wireless network based on the analysis of the first, second, and third pluralities of information.

8. The method of claim 7, wherein the second plurality of information is generated by network elements excluding the mobile phone.

9. The method of claim 8, wherein the network elements generating the second plurality of information comprise at least one of a base transceiver station (BTS), a mobile switching center (MSC), a media gateway, and a billing server.

10. The method of claim 7, wherein the second plurality of information comprises billing records.

11. A method of testing a wireless network, comprising:
obtaining a plurality of mobile phones, wherein each of the plurality of mobile phones is a same first model of mobile phone;
coupling each of the plurality of mobile phones to a computer;
establishing a wireless link between each of the plurality of mobile phones and a base transceiver station, wherein the base transceiver station is coupled to a wireless network;
sending a plurality of test commands from the computer to each of the plurality of mobile phones;
in response to the test commands, generating wireless network events by each of the plurality of mobile phones;
storing a plurality of information about the network events on each of the plurality of mobile phones;
retrieving the plurality of information by the computer from the plurality of mobile phones;
identifying a wireless communication problem experienced by the first model of mobile phone in the wireless network based on the computer analyzing the plurality of information;
obtaining a second plurality of mobile phones, wherein each of the second plurality of mobile phones is a same second model of mobile phone, wherein the second model of phone is different from the first model of phone;
coupling each of the second plurality of mobile phones to the computer;
establishing a wireless link between each of the second plurality of mobile phones and the base transceiver station;
sending a plurality of test commands from the computer to each of the second plurality of mobile phones;
in response to the test commands, generating wireless network events by each of the second plurality of mobile phones;
storing a second plurality of information about the network events on each of the second plurality of mobile phones;
retrieving the second plurality of information by the computer from the second plurality of mobile phones; and
identifying a wireless communication problem experienced by the second model of mobile phone in the wireless network based on the computer further analyzing the second plurality of information.

12. The method of claim 11, wherein a first plurality of test commands is sent by the computer to a first of the plurality of mobile phones based on a first test script and a second plurality of test commands is sent by the computer to a second of the plurality of mobile phones based on a second test script, wherein the first test script is different from the second test script.

13. The method of claim 11, wherein the wireless link between each of the plurality of mobile phones and the base transceiver station is based on one of a code division multiple access (CDMA) wireless communication protocol, a global system for mobile communications (GSM) wireless communication protocol, a long term evolution (LTE) wireless communication protocol, and a worldwide interoperability for microwave access (WiMAX) wireless communication protocol.

14. The method of claim 11, wherein the wireless network events generated by each of the plurality of mobile devices are at least one of connecting a voice call, establishing a data connection, sending a simple message service (SMS) message, and sending a multimedia message service (MMS) message.

15. The method of claim 11, wherein sending the plurality of test commands from the computer to the each of the plurality of mobile phones comprises sending commands that simulate an activation of user interface input.

* * * * *